March 10, 1942. C. E. GIFFORD 2,275,897
REVERSIBLE TRACTOR WHEEL CONSTRUCTION
Filed Sept. 14, 1937  2 Sheets-Sheet 1
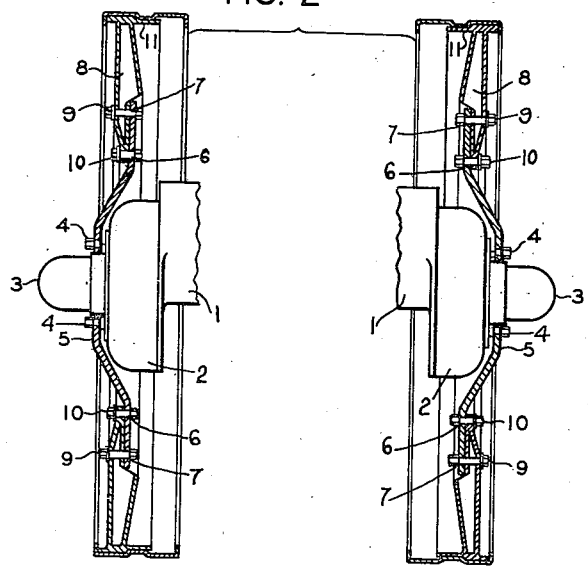
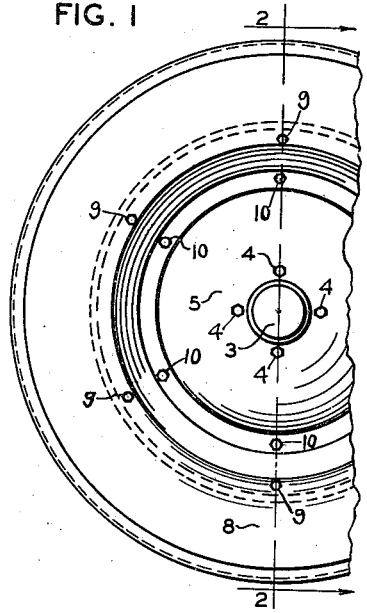
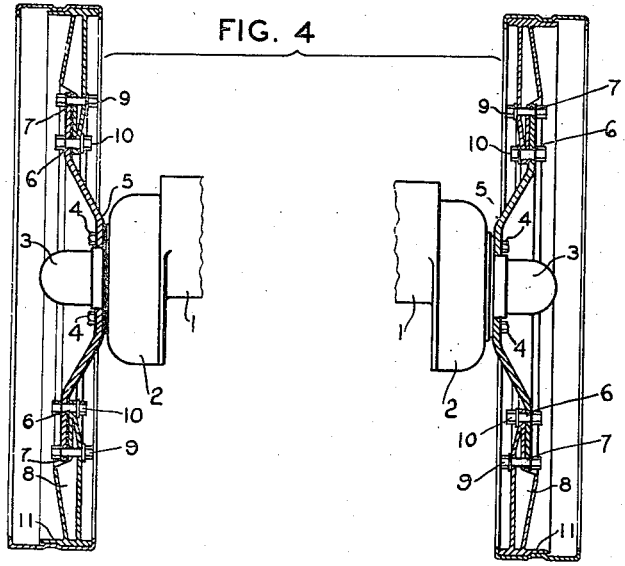
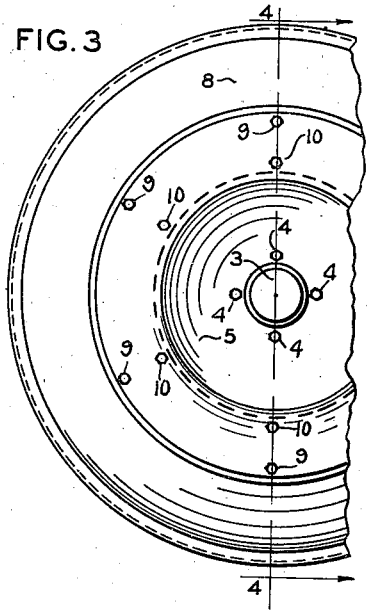
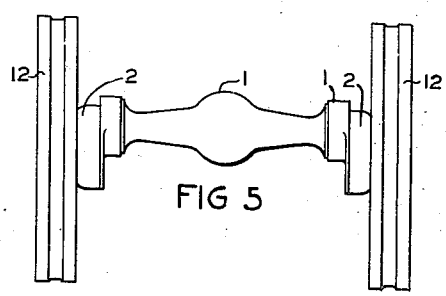
INVENTOR
CLAYTON E. GIFFORD,
BY Toulmin & Toulmin
ATTORNEYS

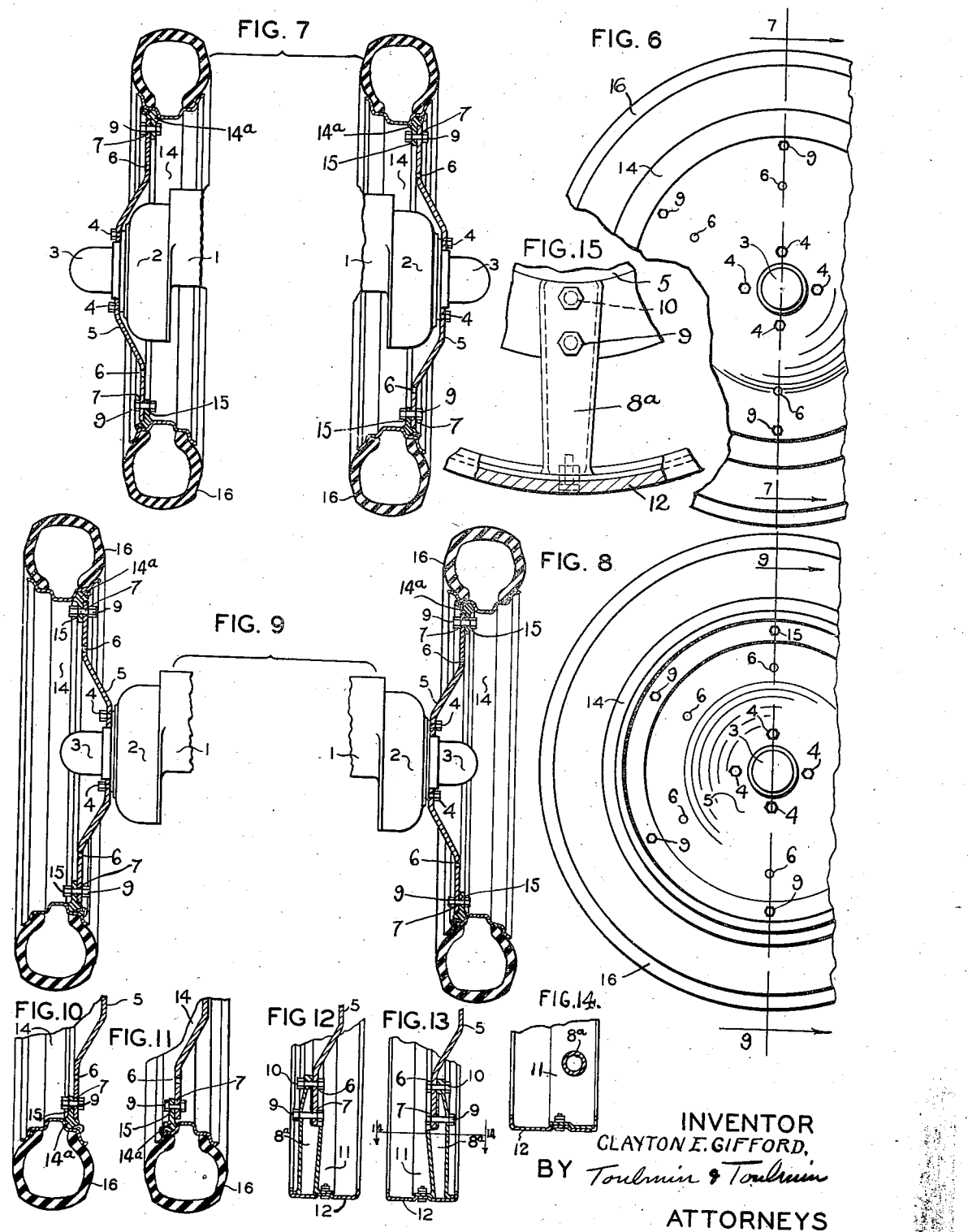

Patented Mar. 10, 1942

2,275,897

UNITED STATES PATENT OFFICE 2,275,897

REVERSIBLE TRACTOR WHEEL CONSTRUCTION

Clayton E. Gifford, Marion, Ohio, assignor to Wingfoot Corporation, Wilmington, Del., a corporation of Delaware Application September 14, 1937, Serial No. 163,814

2 Claims. (Cl. 301—5)

This invention relates to reversible tractor wheel constructions.

It is an object of this invention to provide a tractor wheel construction, wherein the wheels are adapted for selectively receiving demountable rims carrying pneumatic tires of predetermined diameter, or demountable rims carrying metal treads of a different diameter, whereby the clearance of the rear axle and/or differential of the tractor may be varied by substitution of one type of rim for the other type.

It is a further object of this invention to provide, in such a construction, a "dished" or concavo-convex wheel adapted for selective reversal in order to vary the tread of the rear axle of the vehicle.

It is a further object of this invention to provide, in such a wheel, a wheel center member or disk member which is particularly adapted to have demountable rims secured at either side thereof to further vary the tread of the rear axle of the tractor vehicle.

It is a further object of this invention to provide such a construction wherein reversal of the wheels in order to vary the tread of the rear axle of a tractor vehicle may be accomplished without removal of the hubs of the axle.

It is a further object of this invention to provide a rear axle construction for tractors wherein variation of the tread thereof may be accomplished by reversing the position of the wheels on the axle with respect to the axle and/or reversal of demountable rims with respect to the wheels for further variation of the tread of the vehicle.

It is a further object of this invention to provide such a construction wherein the reversal of the wheels and/or rims may be accomplished simply by the removal of detachable wheel bolts and/or lug bolts.

It is a further object of this invention to provide such a wheel construction wherein the utmost structural strength is achieved for the weight of the wheel structure and wherein the structure is cheap, simple to manipulate and extremely unlikely to get out of order.

These and other objects and advantages will appear from the following description taken in connection with the drawings.

In the drawings:

Figure 1 is a fragmentary view, in side elevation, of a tractor wheel constructed according to the principles of this invention, in "narrow tread" position and provided with a demountable rim having a metal tread;

Figure 2 is a fragmentary section taken along the line 2—2 of Figure 1, with the central portion of the tractor axle omitted in the interest of clearness of disclosure;

Figure 3 is a view similar to Figure 1, but showing the wheel in "wide tread" position;

Figure 4 is a section taken along the line 4—4 of Figure 3;

Figure 5 is a rear elevational view of the tractor wheel in "wide tread" position as shown in Figures 3 and 4;

Figure 6 is a view similar to Figure 1, showing the wheels in "narrow tread" position, but equipped with demountable rims having pneumatic tires thereon;

Figure 7 is a section taken along the line 7—7 of Figure 5;

Figure 8 is a view similar to Figure 6, but showing the wheels in "wide tread" position;

Figure 9 is a section taken on the line 9—9 of Figure 8;

Figure 10 is a fragmentary diagrammatic view showing a wheel in "wide tread" position with the pneumatic tired demountable rim secured to one side thereof;

Figure 11 is a view similar to Figure 10, but showing the rubber tired demountable rim secured to the opposite side of the wheel in order to modify the tread width;

Figure 12 is a view similar to Figure 10, but showing the application to one side of the wheel of a demountable rim provided with metallic tread;

Figure 13 is a view similar to Figure 12, but showing the demountable rim of Figure 12, secured to the opposite side of the wheel;

Figure 14 is a fragmentary section taken on the line 14—14 of Figure 13; and

Fig. 15 is a fragmentary side elevation of the construction shown in Figs. 12 and 13.

In the farm tractor art, there are two general types of farm tractors, those having equal treads at front and rear axles and those having a wide rear tread and a narrow front tread, which latter type is known as the cultivator type. The former type is more suitable for the heavier type of farm work, such as plowing and the like, but may not be utilized for row crop cultivation. The latter type is mainly a row crop tractor.

It is the main object of this invention to provide a structure wherein a conventional tractor may be adapted for use in the performance of either of the above types of work and which may be utilized as a uniform tread tractor for heavy plowing and the like, or as a row crop tractor for cultivation of crops in rows.

While this invention relates to the selective modification of the rear tread of a tractor, it is, of course, to be understood that the principles thereof may be applied to the rear tread alone of the tractor, to both front and rear treads of the tractor, or to the front tread of the tractor instead of the rear tread thereof.

By utilizing the principles of this invention, variation in tread of an axle may be achieved where the axle is of the conventional, enclosed type, without the substitution of a long axle having hubs splined thereto and axially movable thereon with the resultant damage to the splines due to the lack of protection and the obvious disadvantage of the above known constructions, wherein oversized shafts are necessitated for rigidity, which shafts require oversized bearings to carry the extra strain imposed by the leverage produced when the hubs are in the extended position on the axle.

Furthermore, according to the principles of this invention, the above advantages may be achieved and, in addition thereto, by the provision of a simple type of removable and reversible disk wheel particularly adapted to receive at either side thereof a demountable rim equipped with a pneumatic tire or a demountable rim equipped with a steel or metallic tire of different diameter, the clearance of the axle may be widely varied in order that the tractor, when used in row crop cultivation, will be provided with sufficient clearance to clear, without damage, small plants cultivated by the tractor.

Likewise, by utilizing a demountable rim equipped with a pneumatic tire, or steel tire, of lesser diameter, the center of gravity of the differential and rear end of the tractor may be brought nearer the earth in order to increase the stability thereof when utilized for farm work requiring the expenditure by the tractor of high torque.

Crops such as corn, cotton, beans, potatoes, etc. are commonly planted in rows having a variation in row spacing from approximately 28" to 42" and various intermediate widths. By reversing the dish, or concavity and convexity, of the wheels and by being able to transfer the rim overhang from one side of the dished wheel center or disk to the other, it is possible, without removing the hub from the tractor axle, to obtain the necessary rear tread variation to adapt the tractor to the various row widths.

I am thus enabled, by the practice of the principles of this invention, to secure such necessary and desirable rear tread widths as will permit the tractor wheels to travel between the rows at approximately midway therebetween in order to prevent multilation of the crops growing in rows, by the tractor wheels.

Furthermore, it is also possible, by the practice of the principles of my invention, to equip a tractor with a dished or concavo-convex wheel center or disk (which is reversible) and supply rims equipped with both steel and pneumatic traction means, to equip a tractor for use upon wet or soft ground, wherein steel wheels equipped with lugs give better traction than rubber and/or for use on dry terrain or on highways, the change being made in a simple and convenient manner by substitution of one type of rim for the other without disturbing the wheel center.

I have herein illustrated two types of steel tired rims, the form illustrated in Figures 1 to 4 inclusive having disk type flanges, while the form illustrated in Figures 12, 13 and 14 is provided, in known manner, with a plurality of radially disposed spokes rigidly secured to the tire thereof.

Referring to the drawings in detail and with reference particularly to Figure 5, the rear axle of the tractor is supported in the differential housing 1 having at each end thereof a housing 2 enclosing reduction gearing. As shown in Figures 2, 4, 7 and 9, a rotatable hub 3 extends outwardly from each of the housings 2, and this hub is provided with suitable screw-threaded bores for wheel bolts 4, by means of which the dished or concavo-convex wheel disk 5 is demountably attached to the hub 3.

The wheel disk 5 is provided, adjacent its periphery, at arcuately spaced intervals with pairs of apertures, of which the inner apertures are designated 6 and the outer apertures are designated 7. Adapted to be secured to the wheel center or disk 5, either at its convex side, as shown in Figures 1, 2, 3, 4 and 13, or to the concave side of the wheel center 5 (as shown in Figure 12) is a demountable rim 8 having suitable apertures for receiving bolts 9 extending through the apertures 7 and bolts 10 extending through the apertures 6.

The demountable rim 8 is provided with an integral exterior flange 11, to which is rigidly secured by any suitable means, such as bolting or welding, the metal tire 12, which though shown as smooth, may, of course, be provided with suitable cleats, lugs, or other traction producing projections. When the metal-tired demountable rims 8 are applied to the wheels, as shown in Figures 1 to 4 and 13, a narrow rear tread may be secured in the rear axle of the vehicle by arranging the wheel centers 5 with their convex surface outwardly, as shown in Figures 1 and 2. The tread width provided by such arrangement is preferably such that the tires 12 of the rear wheels of the tractor will track with, or be in alignment with, those of the front wheels of the tractor.

In order to substantially increase the tread of the tractor, the wheels may be reversed by removing the wheel bolts 4 and reversing the wheels, as shown in Figures 3 and 4, so that the concave side of the wheel disks 5 will be disposed outwardly of the axle. This materially increases the tread of the rear axle of the tractor so that the tread of the rear axle is wider than the tread of the front axle of the tractor vehicle.

The tread width provided by the adjustment shown in Figures 1 and 2 may be further varied by reversing the position of the demountable rims 8 with respect to the wheel disks, as shown in Figure 12, in which case the tread width will take a value intermediate those of the tread widths in Figures 1 and 2, and in Figures 3 and 4. Likewise, a different intermediate value of tread width may be provided by reversing the position of the rims 8 with respect to the wheels 5 in the arrangement shown in Figures 3 and 4.

It will thus be seen that, by the provision of the dished or concavo-convex demountable wheel disk and demountable rim therefor, having the metal tire thereof disposed in offset relation with respect to the center of the demountable rim, I am enabled to achieve a plurality of tread widths for a given axle equipped according to the principles of this invention. It is, of course, to be understood that the width of the demountable rims 8 may be substantially varied in order to produce a desired wheel diameter and to vary the clearance of the differential 1 of the tractor vehicle.

Where it is desired to reduce the wheel diameter and to provide utmost traction for heavy pulling work, the metal-tired wheel illustrated in Figures 1 to 5 is replaced by the rubber tire equipped demountable rim 14 which is substituted for the steel tire equipped demountable rim 8, as shown in Figures 6 to 11 inclusive. The rim 14 is clamped or otherwise secured as usual to a ring 14a having an inwardly disposed flange provided with suitably located apertures 15 which are adapted to receive the outer rim bolts 9 which are secured in the outer apertures 7 of the wheel 5. The external diameters of the metal-tired and rubber-tired rims may, of course, be equal.

It is not necessary to utilize the apertures 6, when applying the rim 14 to the wheel 5. When the rim 14 is applied to the concave side of the wheel disk 5, as illustrated in Figure 10, a narrow tread may be achieved by directing the concave sides of the wheels 5 inwardly, as shown in Figure 7. In order to increase the tread width to wide tread, it is merely necessary to remove the wheel bolts 4 and reverse the wheels 5 so that the concave surfaces thereof are directed outwardly, as shown in Figure 9.

A tread length of value intermediate the value of the tread length shown in Figure 7 and that shown in Figure 9, may be achieved by attaching the rim 14 to the opposite or convex side of the wheel centers 5, as illustrated in Figure 11, where the wheels are disposed as shown in Figure 7. A second and different intermediate tread length may likewise be achieved by attaching the rims 14 so that the tire 16 is disposed toward the convex sides of the wheels 5, as shown in Figure 11, when the concave sides of the wheels are disposed outwardly, as shown in Figure 9.

It will, therefore, most clearly appear that, by substitution of the pneumatic-tired demountable rims for the metal-tired demountable rims, the diameter of the rear wheels may be decreased in order to increase the torque of the tractor; while, at the same time, the traction is increased by the provision of the rubber tires on the rims 14. These rubber tires are designated 16.

Various rim constructions may, of course, be utilized, including those comprising radial spokes 8a bolted, or otherwise rigidly secured, to the tire members thereof, such as those illustrated in Figures 12, 13, 14 and 15.

It will be seen that, by the utilization of the principles of my invention, I am enabled to so equip a conventional tractor structure as to provide wide variation in the tread width thereof, either at front or rear, or both, and that I am furthermore enabled to vary the wheel diameter in order to vary the clearance of the vehicle; and furthermore, by a mere substitution of rubber tire equipped demountable rims for metal tire equipped demountable wheels, to change the vehicle from a steel tired vehicle to a rubber tired vehicle and vice versa.

It will be understood that the above-described structure is merely illustrative of the manner in which the principles of my invention may be utilized and that I desire to comprehend within my invention such modifications as come within the scope of the claims and the invention.

Having thus fully described my invention, what I claim as new and desire to secure by Letters Patent is:

1. In combination, a wheel hub, an annular rim supporting member having an inner portion reversibly mounted on said hub, the outer portion of said member being axially offset from said inner portion, and a rim reversibly mounted on either side of said member.

2. In combination, a wheel hub, an annular rim supporting member having an inner portion adapted to be mounted in either of two reversed positions on said hub, the outer portion of said member being axially offset from said inner portion, and a rim adapted to be mounted in either of two reversed positions on either side of said member.

CLAYTON E. GIFFORD.